(12) United States Patent
Jimbo et al.

(10) Patent No.: US 11,986,902 B2
(45) Date of Patent: May 21, 2024

(54) WELDED PRODUCT AND METHOD OF PRODUCING WELDED PRODUCT

(71) Applicant: HONDA MOTOR CO., LTD., Tokyo (JP)

(72) Inventors: Hiroki Jimbo, Tokyo (JP); Tatsumasa Hidaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/173,089

(22) Filed: Feb. 23, 2023

(65) Prior Publication Data

US 2023/0302570 A1 Sep. 28, 2023

(30) Foreign Application Priority Data

Mar. 24, 2022 (CN) .......................... 202210298257.4

(51) Int. Cl.
| | |
|---|---|
| B23K 25/00 | (2006.01) |
| B23K 35/30 | (2006.01) |
| C22C 38/00 | (2006.01) |
| C22C 38/02 | (2006.01) |
| C22C 38/04 | (2006.01) |
| B23K 103/04 | (2006.01) |

(52) U.S. Cl.
CPC ............ *B23K 25/00* (2013.01); *C22C 38/002* (2013.01); *C22C 38/02* (2013.01); *C22C 38/04* (2013.01); *B23K 35/3073* (2013.01); *B23K 2103/04* (2018.08)

(58) Field of Classification Search
CPC ........ B32B 15/18; B23K 9/164; B23K 25/00; B23K 2103/04; B23K 35/3073; C22C 38/02; C22C 38/04
USPC .......................................................... 428/683
See application file for complete search history.

(56) References Cited

U.S. PATENT DOCUMENTS

2018/0369945 A1* 12/2018 Kodama ............ B23K 35/3073

FOREIGN PATENT DOCUMENTS

| JP | 2021003717 A | 1/2021 |
|---|---|---|
| JP | 2021178354 A | * 11/2021 |

OTHER PUBLICATIONS

Harano et al., JP-2021178354-A Google Patents machine translation printed on Sep. 30, 2023, Nov. 18, 2021, entire translation (Year: 2021).*

* cited by examiner

*Primary Examiner* — Katherine A Christy
(74) *Attorney, Agent, or Firm* — CKC & Partners Co., LLC

(57) ABSTRACT

A welded product includes: multiple steel members; and one or two or more welds with which the multiple steel members are welded together, at least one of the welds having a surface containing slag, the slag having a Si content of 14% by mass or less and having a mass ratio of Si to Mn of 0.25 or less.

4 Claims, 3 Drawing Sheets

WELDED PRODUCT AND METHOD OF PRODUCING WELDED PRODUCT

This application is based on and claims the benefit of priority from Chinese Patent Application No. CN202210298257.4, filed on 24 Mar. 2022, the content of which is incorporated herein by reference.

BACKGROUND OF THE INVENTION

Field of the Invention

The present invention relates to a welded product and a method of producing a welded product.

Related Art

A conventional process for producing a welded product includes arc-welding multiple steel members in shielding gas using a welding wire. In this process, slag is formed on the weld surface through the reaction between oxygen in the active gas component of the shielding gas and elements in the steel members and the welding wire, such as Si and Mn.

The welded product is then subjected to electrodeposition coating for improving its corrosion resistance, in which, however, the slag cannot easily be coated by the electrodeposition.

Patent Document 1 discloses a solid wire consisting of C: 0.03 to 0.15% by mass, Si: more than 0 to 0.29% by mass, Mn: 0.5 to 2.8% by mass, Ti: 0.10 to 0.30% by mass, Al: 0.003 to 0.30% by mass, Sn: 0.02 to 0.40% by mass, P: more than 0 to 0.015% by mass, S: more than 0 to 0.030% by mass, B: 0 to 0.0100% by mass, Cr: 0 to 1.5% by mass, Ni: 0 to 3.0% by mass, Mo: 0 to 1.0% by mass, Nb: 0 to 0.3% by mass, V: 0 to 0.3% by mass, Cu: 0 to 0.50% by mass, and a balance of iron and unavoidable impurities.

Patent Document 1: Japanese Unexamined Patent Application, Publication No. 2021-3717

SUMMARY OF THE INVENTION

There is, however, a need to improve the ability of slag to be coated by electrodeposition.

It is an object of the present invention to provide a welded product containing slag having a higher ability to be coated by electrodeposition.

An aspect of the present invention is directed to a welded product including: multiple steel members; and one or two or more welds with which the multiple steel members are welded together, at least one of the welds having a surface containing slag, the slag having a Si content of 14% by mass or less and having a mass ratio of Si to Mn of 0.25 or less.

The steel members may have a Si content of 0.72% by mass or less.

The slag may have a dendrite structure.

The slag may have a thickness of 50 μm or less.

Another aspect of the present invention is directed to a method of producing the welded product defined above, the method including subjecting multiple base steel materials to arc welding in a shielding gas.

The shielding gas may have a volume ratio of active gas to inert gas of 5/95 or more and 14/86 or less.

The present invention provides a welded product containing slag having a higher ability to be coated by electrodeposition.

DETAILED DESCRIPTION OF THE INVENTION

Figure 1:
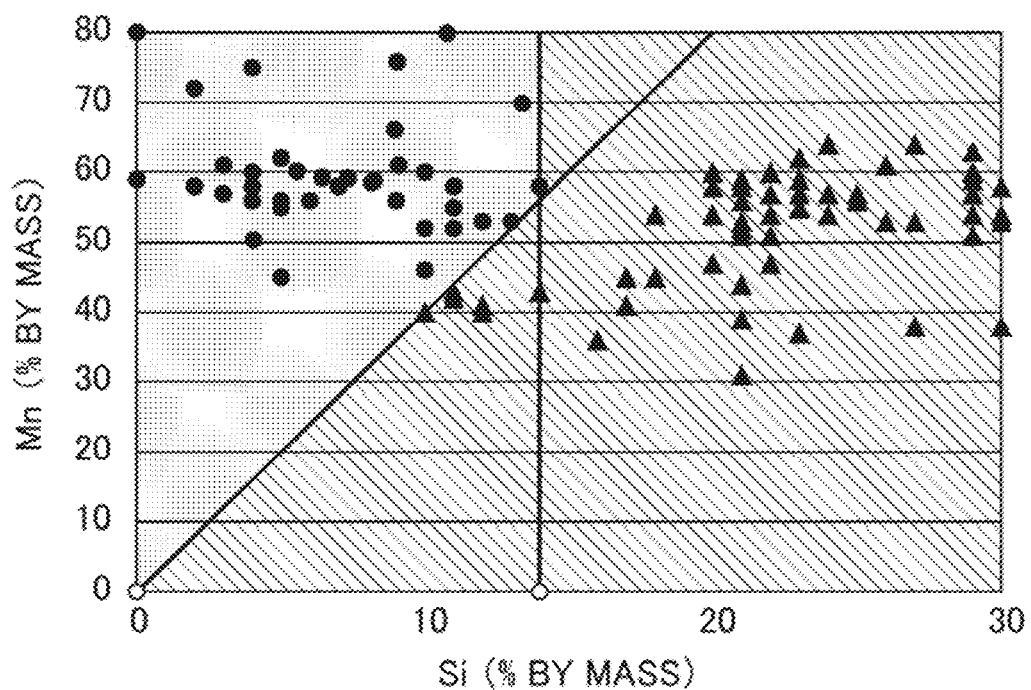
FIG. 1 is a graph showing the relationship between the contents of Si and Mn in slag and the ability of the slag to be coated by electrodeposition.

Hereinafter, embodiments of the present invention will be described.

The welded product according to an embodiment of the present invention includes: multiple steel members; and one or two or more welds with which the multiple steel members are welded together, in which at least one of the welds has a surface containing slag. The welded product may include any number of steel members welded together.

The content of Si in the slag is 14% by mass or less and preferably 10% by mass or less. The slag with a Si content of more than 14% by mass will have a reduced ability to be coated by electrodeposition. In this regard, the content of Si in the slag is typically, but not limited to, 0% by mass or more.

The mass ratio of Si to Mn in the slag is 0.25 or less and preferably 0.15 or less. The slag with a mass ratio of Si to Mn of more than 0.25 will have a reduced ability to be coated by electrodeposition and thus will make it less easy to perform coating film formation on the weld.

The content of Si in the steel members is preferably 0.72% by mass or less and more preferably 0.10% by mass or less. The steel members with a Si content of 0.72% by mass or less can produce slag with a reduced Si content, which will have an improved ability to be coated by electrodeposition and make it possible to effectively perform coating film formation on the weld. In this regard, the content of Si in the steel members is typically, but not limited to, 0.005% by mass or more.

The content of C in the steel members is typically, but not limited to, 0.03% by mass or more and 0.10% by mass or less.

The content of Mn in the steel members is typically, but not limited to, 1.00% by mass or more and 2.00% by mass or less.

The content of P in the steel members is typically, but not limited to, 0.001% by mass or more and 0.02% by mass or less.

The content of S in the steel members is typically, but not limited to, 0.001% by mass or more and 0.010% by mass or less.

The multiple steel members may have the same composition or different compositions.

The slag preferably has a dendrite structure. The dendrite structure allows the slag to have an improved ability to be coated by electrodeposition. This is probably attributable to the presence of Si-rich and Mn-rich phases on the order of nanometers. In this regard, the mass ratio of Si to Mn in the Si-rich phase is, for example, 0.13 or more and 0.31 or less. The mass ratio of Si to Mn in the Mn-rich phase is, for example, 0.01 or more and 0.07 or less. The Mn-rich phase has a higher ability to be coated by electrodeposition and can be formed homogeneously on the order of micrometers. Thus, the Mn-rich phase makes it possible to perform coating film formation homogeneously and effectively on the weld.

The thickness of the slag may be defined as the shortest distance between the top of the slag and the steel member which forms an electrically conductive path. In this case, the thickness of the slag is preferably 50 µm or less and more preferably 30 µm or less. The slag with a thickness of 50 µm or less will have an improved ability to be coated by electrodeposition and make it possible to effectively perform coating film formation on the weld. In this regard, the thickness of the slag is typically, but not limited to, 10 µm or more.

The welded product according to an embodiment of the present invention may be produced by a process including subjecting multiple base steel materials to arc welding in a shielding gas. In this process, a welding wire may be used if necessary.

The composition of the base steel materials to be arc-welded is the same as that of the steel members of the welded product according to an embodiment of the present invention.

The volume ratio of active gas to inert gas in the shielding gas is preferably 5/95 or more and 14/86 or less and more preferably 5/95 or more and 10/90 or less. The shielding gas with a volume ratio of active gas to inert gas of 5/95 or more can make the weld penetration depth lager and reduce the occurrence of defects, such as blowholes and pits. The shielding gas with a volume ratio of active gas to inert gas of 14/86 or less can reduce the production or thickness of slag.

Examples of the active gas include, but are not limited to, carbon dioxide ($CO_2$) and oxygen ($O_2$). Examples of the inert gas include, but are not limited to, argon (Ar) and helium (He).

The content of Si in the welding wire is preferably 0.09% by mass or less and more preferably 0.05% by mass or less. The welding wire with a Si content of 0.09% by mass or less can produce slag having a reduced Si content and having an improved ability to be coated by electrodeposition. In this regard, the content of Si in the welding wire is typically, but not limited to, 0.005% by mass or more.

The content of C in the welding wire is typically, but not limited to, 0.02% by mass or more and 0.15% by mass or less.

The content of Mn in the welding wire is typically, but not limited to, 1.40% by mass or more and 2.10% by mass or less.

The content of P in the welding wire is typically, but not limited to, 0.001% by mass or more and 0.02% by mass or less.

The content of S in the welding wire is typically, but not limited to, 0.001% by mass or more and 0.02% by mass or less.

The embodiments of the present invention described above are not intended to limit the present invention and may be altered or modified as appropriate without departing from the gist of the present invention.

EXAMPLES

Hereinafter, the present invention will be described with reference to examples, which are not intended to limit the present invention.

Production of Welded Product

In a MAG (metal active gas) pulse welding machine, 440 MPa-grade plated steel sheets of 2.0 mm in thickness (base steel materials) were arc-welded in a shielding gas using a welding wire. As a result, a welded product was obtained having the steel members welded together with a weld. Using this process, lap fillet welding, T-joint welding, and flare joint welding were performed with different pulse currents and different arc voltages.

The welding wire included 0.07% by mass of C, 0.05% by mass of Si, 1.6% by mass of Mn, 0.0015% by mass of P, 0.006% by mass of S, 0.2% by mass of Ti, 0.2% by mass of Cu, and a balance of iron and unavoidable impurities. The 440 MPa-grade plated steel sheets included 0.06% by mass of C, 0.1% by mass of Si, 1.2% by mass of Mn, 0.01% by mass of P, 0.02% by mass of S, and a balance of iron and unavoidable impurities. The shielding gas had a volume ratio of $CO_2$ to Ar of 10/90.

Elemental Analysis of Slag

The slag present at the surface of the weld was subjected to elemental analysis using a field emission scanning electron microscope (FE-SEM). Specifically, carbon was vapor-deposited on the weld, and then the slag was subjected to elemental analysis by energy dispersive X-ray spectroscopy (EDS) under the conditions shown below.

Acceleration voltage: 20 kV
Analysis area: 0.1 mm×0.1 mm

However, O and C were excluded from the detection target elements in order to eliminate the influence of vapor deposition, contamination, and other factors.

Ability of Slag to Be Coated by Electrodeposition

The surface of the welded product was degreased with an alkaline degreaser, Fine Cleaner L4460 (manufactured by Nihon Parkerizing Co., Ltd.), and then thoroughly washed with water. Subsequently, the surface of the welded product was subjected to chemical conversion treatment with a zinc-based surface conditioner, Prepalene X (manufactured by Nihon Parkerizing Co., Ltd.), and a zinc phosphate chemical conversion agent for base coating, Palbond L3020 (manufactured by Nihon Parkerizing Co., Ltd.), and then thoroughly washed with water. Subsequently, the surface of the welded product was subjected to cationic electrodeposition coating with electrodeposition paint, ED6551G (manufactured by PPG Industries), in such a way that an electrodeposited coating with a thickness of 25 µm was formed. Subsequently, the coating was washed with water and then baked at 170° C. for 20 minutes. The ability of the slag to be coated by the electrodeposition was then visually evaluated. The criteria for evaluating the ability of the slag to be coated by the electrodeposition were as follows. OK: It was evaluated as "OK" when the coating film formed by the cationic electrodeposition coating covered the entire surface of the slag. NG: It was evaluated as "NG" when the coating film formed by the cationic electrodeposition coating partially covered the surface of the slag.

FIG. 1 shows the relationship between the contents of Si and Mn in the slag and the ability of the slag to be coated by electrodeposition.

FIG. 1 reveals that the ability of the slag to be coated by electrodeposition was evaluated as "OK" in cases where the slag had a Si content of at most 14% by mass and a mass ratio of Si to Mn of at most 0.25 and evaluated as "NG" in the other cases.

Hereinafter, cases where the slag has a Si content of at most 14% by mass and a mass ratio of Si to Mn of at most 0.25 will be called examples, and the other cases will be called comparative examples.

Figure 2:
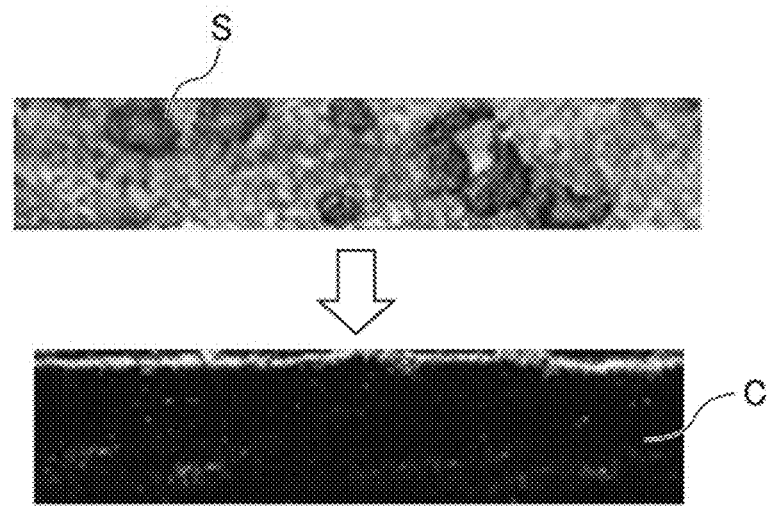
FIG. 2 is an optical micrograph showing the surface of a weld before and after cationic electrodeposition coating in an example.

FIG. 2 shows optical micrographs of the surface of the weld taken before and after the cationic electrodeposition coating in an example.

FIG. 2 shows that the coating film C formed by the cationic electrodeposition coating covers the entire surface of the slag S.

Figure 3:
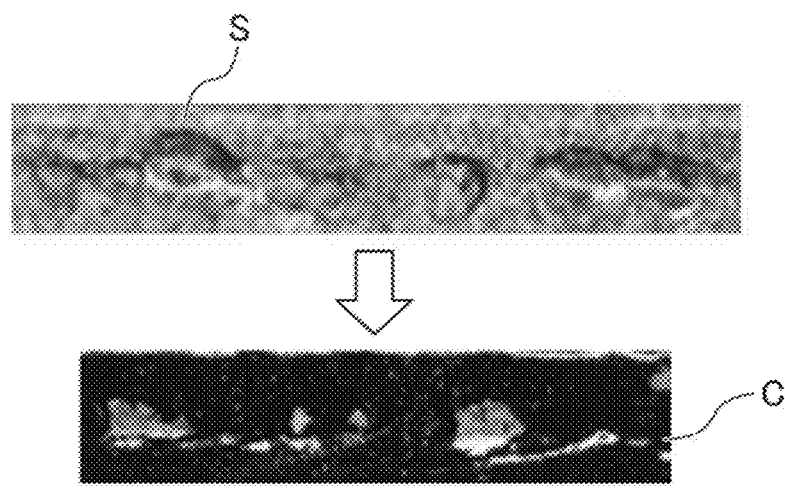
FIG. 3 is an optical micrograph showing the surface of a weld before and after cationic electrodeposition coating in a comparative example.

FIG. 3 shows optical micrographs of the surface of the weld taken before and after the cationic electrodeposition coating in a comparative example.

FIG. 3 shows that the coating film C formed by the cationic electrodeposition coating partially covers the surface of the slag S.

Figure 4:
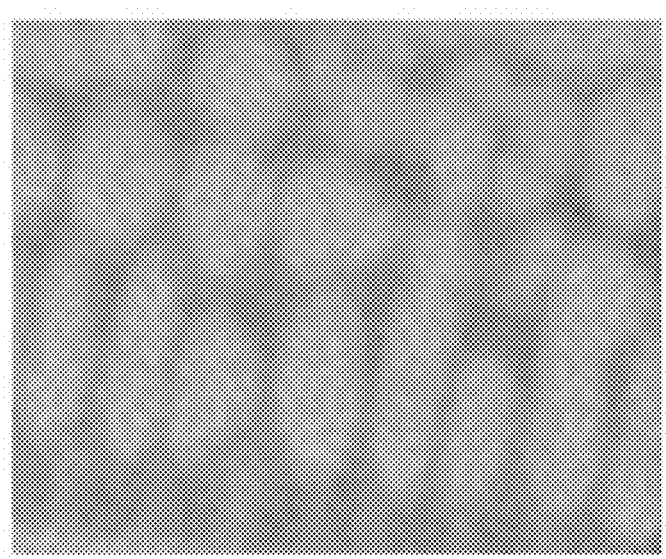
FIG. 4 is a scanning electron microscope (SEM) photograph (close-up photograph) showing a cross-section of a slag before cationic electrodeposition coating in an example.

FIG. 4 shows an SEM photograph (close-up photograph) of a cross-section of the slag taken before the cationic electrodeposition coating in an example.

FIG. 4 reveals that the slag of the example has a dendrite structure. In the photograph, the deep-colored area corresponds to a Si-rich phase with a mass ratio of Si to Mn of 0.13 or more and 0.31 or less. The light-colored area corresponds to a Mn-rich phase with a mass ratio of Si to Mn of 0.03 or more and 0.07 or less.

Figure 5A:
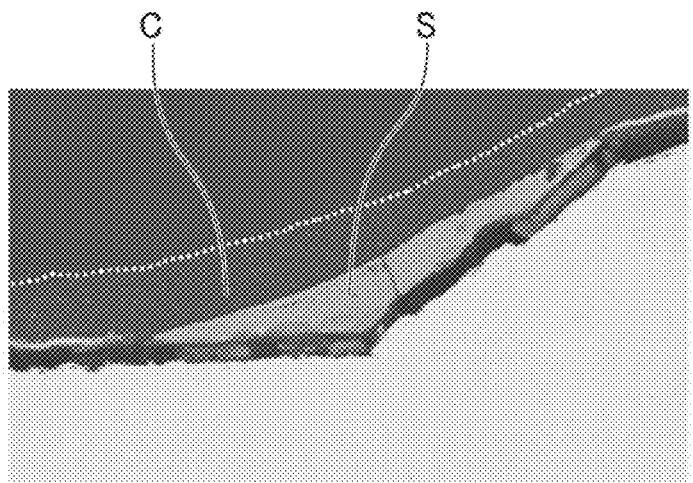
FIGS. 5A and 5B are SEM photographs showing a cross-section of a slag after cationic electrodeposition coating in an example.
Figure 5B:
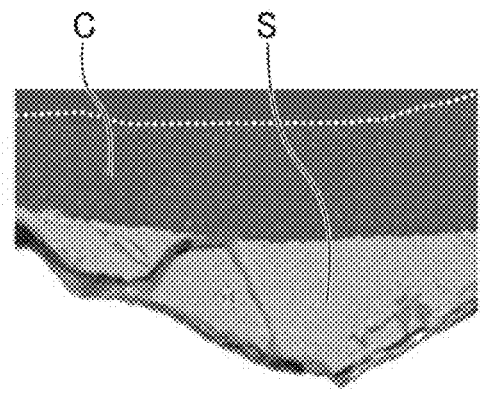

FIGS. 5A and 5B show SEM photographs of cross-sections of the slag taken after the cationic electrodeposition coating in an example.

FIGS. 5A and 5B show that the coating film C formed by the cationic electrodeposition coating covers the entire surface of the slag S. The slags S shown in FIGS. 5A and 5B respectively have thicknesses of 36 μm and 50 μm.

What is claimed is:

1. A welded product comprising: a plurality of steel members; and one or two or more welds with which the plurality of steel members are welded together,
   at least one of the welds having a surface containing slag,
   the slag having a Si content of 14% by mass or less and having a mass ratio of Si to Mn of 0.25 or less, as well as having a dendrite structure in which a Si-rich phase and a Mn-rich phase are present,
   the mass ratio of Si to Mn in the Si-rich phase being 0.13 or more and 0.31 or less,
   the mass ratio of Si to Mn in the Mn-rich phase being 0.01 or more and 0:07 or less.

2. The welded product according to claim 1, wherein the steel members have a Si content of 0.72% by mass or less.

3. The welded product according to claim 1, wherein the slag has a thickness of 50 μm or less.

4. A method of producing the welded product according to claim 1,
   the method comprising subjecting a plurality of base steel materials to arc welding in shielding gas by using a welding, wire,
      wherein the welding wire has a Si content of 0.09% by mass,
      the base steel has the same composition as the steel members, and
      the shielding gas has a volume ratio of active gas to inert gas of 5/95 or more and 14/86 or less.

* * * * *